US010535261B2

(12) United States Patent
Alqahtani et al.

(10) Patent No.: US 10,535,261 B2
(45) Date of Patent: Jan. 14, 2020

(54) GPS-BASED VEHICULAR SPEED LIMITING SYSTEM

(71) Applicants: Mutaeb Alqahtani, Richmond, VA (US); Abdullah Alqahtani, Richmond, VA (US)

(72) Inventors: Mutaeb Alqahtani, Richmond, VA (US); Abdullah Alqahtani, Richmond, VA (US)

(*) Notice: Subject to any disclaimer, the term of this patent is extended or adjusted under 35 U.S.C. 154(b) by 101 days.

(21) Appl. No.: 15/990,967

(22) Filed: May 29, 2018

(65) Prior Publication Data

US 2019/0371169 A1     Dec. 5, 2019

(51) Int. Cl.
| G05D 1/00 | (2006.01) |
| G08G 1/0967 | (2006.01) |
| G08G 1/0968 | (2006.01) |
| G08G 1/0969 | (2006.01) |
| B60W 30/14 | (2006.01) |
| B60K 35/00 | (2006.01) |
| B60W 50/00 | (2006.01) |

(52) U.S. Cl.
CPC ....... *G08G 1/096725* (2013.01); *B60K 35/00* (2013.01); *B60W 30/146* (2013.01); *G08G 1/0969* (2013.01); *G08G 1/096861* (2013.01); *B60K 2370/46* (2019.05); *B60K 2370/682* (2019.05); *B60K 2370/834* (2019.05); *B60W 2050/0078* (2013.01); *B60W 2520/10* (2013.01); *B60W 2550/22* (2013.01); *B60W 2550/406* (2013.01); *B60W 2720/10* (2013.01)

(58) Field of Classification Search
CPC ............. G08G 1/096725; B60K 35/00; B60W 30/146
See application file for complete search history.

(56) References Cited

U.S. PATENT DOCUMENTS

| D724,977 S | 3/2015 | Browning |
| 9,056,550 B2 | 6/2015 | Quoc |
| 9,199,611 B2 | 12/2015 | Hatfield |
| 9,503,887 B1 | 11/2016 | Tuluca |
| 9,557,179 B2 | 1/2017 | Finlow-Bates |
| 9,566,896 B2 | 2/2017 | Lopez |
| 9,630,555 B1 | 4/2017 | Prakah-Asante |
| 2011/0093304 A1* | 4/2011 | Nielsen .............. G06Q 10/0631 705/7.12 |
| 2016/0207535 A1 | 7/2016 | Bwalanda |

FOREIGN PATENT DOCUMENTS

EP     2533215 A    12/2012

* cited by examiner

*Primary Examiner* — Adam M Alharbi

(57) ABSTRACT

The GPS-based vehicular speed limiting system comprises an on board diagnostic (OBD) interface unit and a GPS unit. The OBD interface unit plugs into the OBD-2 (or equivalent) connector inside the passenger compartment of a vehicle and communicates with one or more vehicle computers. The GPS unit receives signals from GPS satellites to determine the current vehicle location, which it may then display in map form utilizing map data stored in memory within the GPS. If the OBD interface unit determines that the vehicle is traveling faster than the posted speed limit, as determined by information stored in the map data and communicated to the OBD interface unit over the wireless link, the OBD interface unit may command the vehicle computers to limit the speed of the vehicle. Unplugging the OBD interface unit may result in a notification being sent to a smartphone.

18 Claims, 4 Drawing Sheets

GPS-BASED VEHICULAR SPEED LIMITING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicle safety, more specifically, a GPS-based vehicular speed limiting system.

SUMMARY OF INVENTION

The GPS-based vehicular speed limiting system comprises an on board diagnostic (OBD) interface unit and a GPS unit. The OBD interface unit plugs into the OBD-2 (or equivalent) connector inside the passenger compartment of a vehicle and communicates with one or more vehicle computers. The GPS unit receives signals from GPS satellites to determine the current vehicle location, which it may then display in map form utilizing map data stored in memory within the GPS. If the OBD interface unit determines that the vehicle is traveling faster than the posted speed limit, as determined by information stored in the map data and communicated to the OBD interface unit over the wireless link, the OBD interface unit may command the vehicle computers to limit the speed of the vehicle. Unplugging the OBD interface unit may result in a notification being sent to a smartphone.

An object of the invention is to limit the speed of a vehicle to the posted speed limit.

Another object of the invention is to determine when the vehicle is traveling over the posted speed limit by determining the vehicle location using a GPS system, determining the posted speed limit from GPS map data at that location, and comparing the posted speed with the actual speed of the vehicle.

A further object of the invention is to limit the speed by communicating commands from an on board diagnostic interface unit.

Yet another object of the invention is to send a notification to a remote smart phone if the on board diagnostic interface unit is unplugged from the OBD-2 connector in the vehicle.

These together with additional objects, features and advantages of the GPS-based vehicular speed limiting system will be readily apparent to those of ordinary skill in the art upon reading the following detailed description of the presently preferred, but nonetheless illustrative, embodiments when taken in conjunction with the accompanying drawings.

In this respect, before explaining the current embodiments of the GPS-based vehicular speed limiting system in detail, it is to be understood that the GPS-based vehicular speed limiting system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the GPS-based vehicular speed limiting system.

It is therefore important that the claims be regarded as including such equivalent construction insofar as they do not depart from the spirit and scope of the GPS-based vehicular speed limiting system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
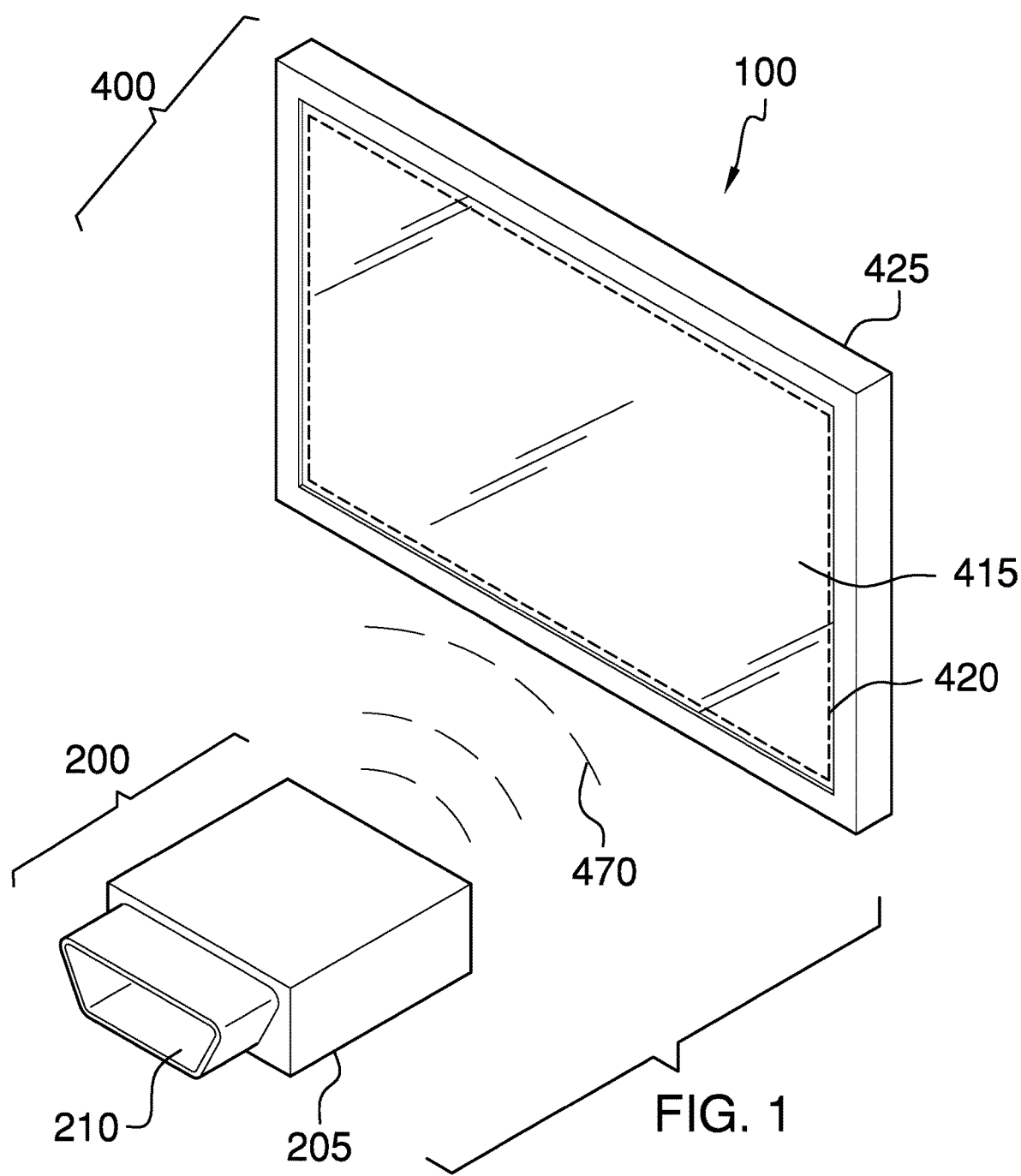
FIG. 1 is a perspective view of an embodiment of the disclosure.
Figure 2:
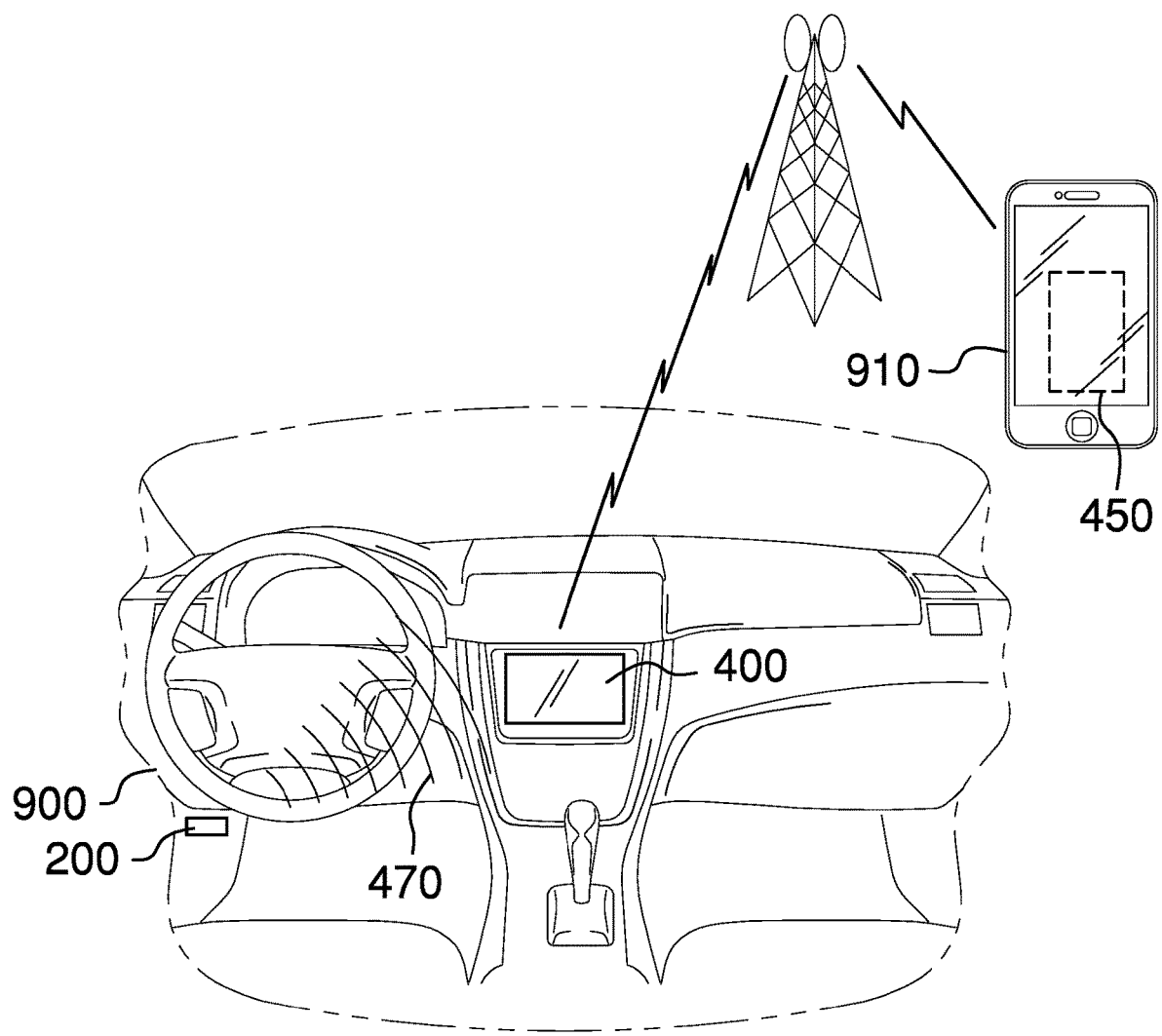
FIG. 2 is a front view of an embodiment of the disclosure installed in a vehicle.
Figure 3:
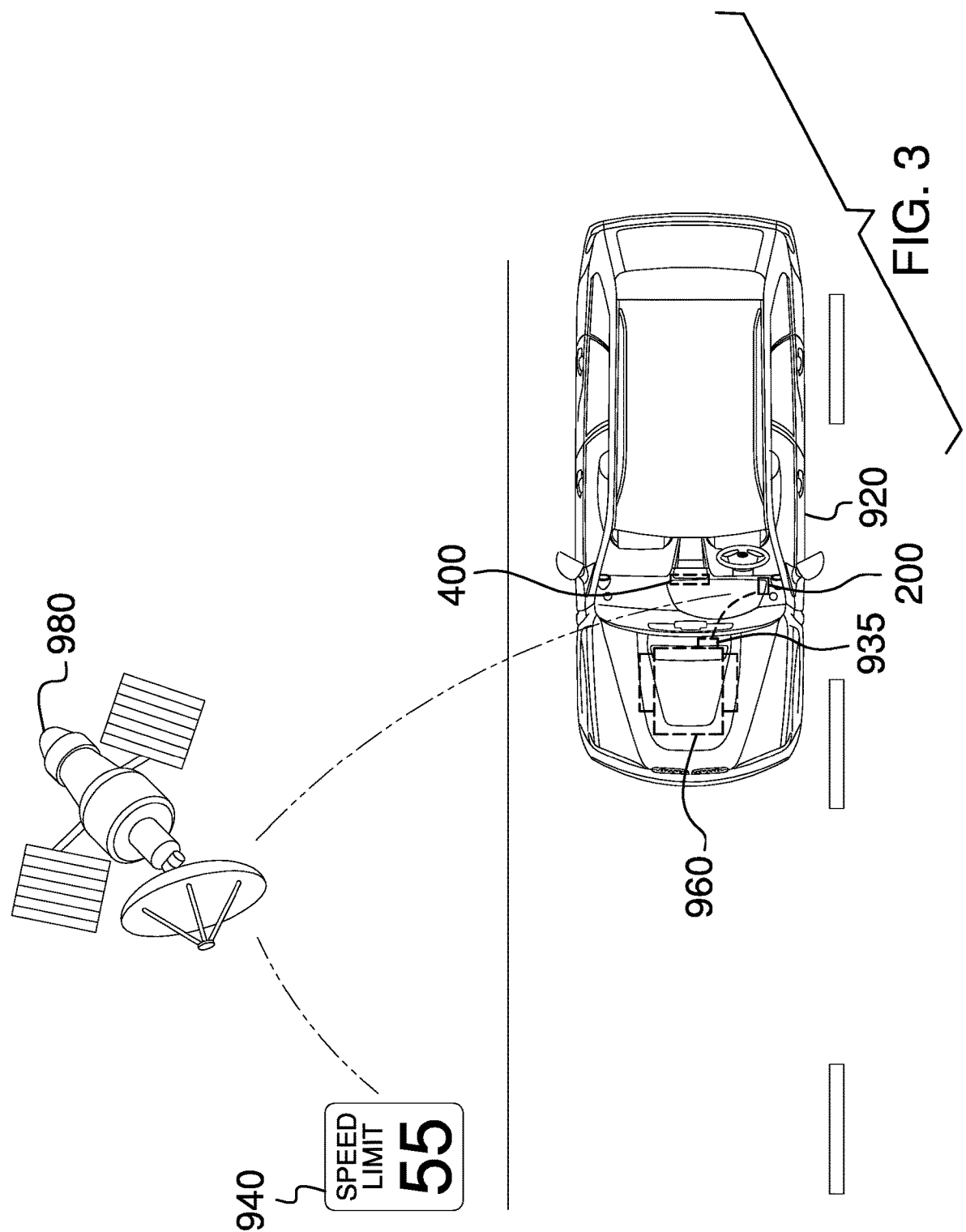
FIG. 3 is an in-use view of an embodiment of the disclosure.
Figure 4:
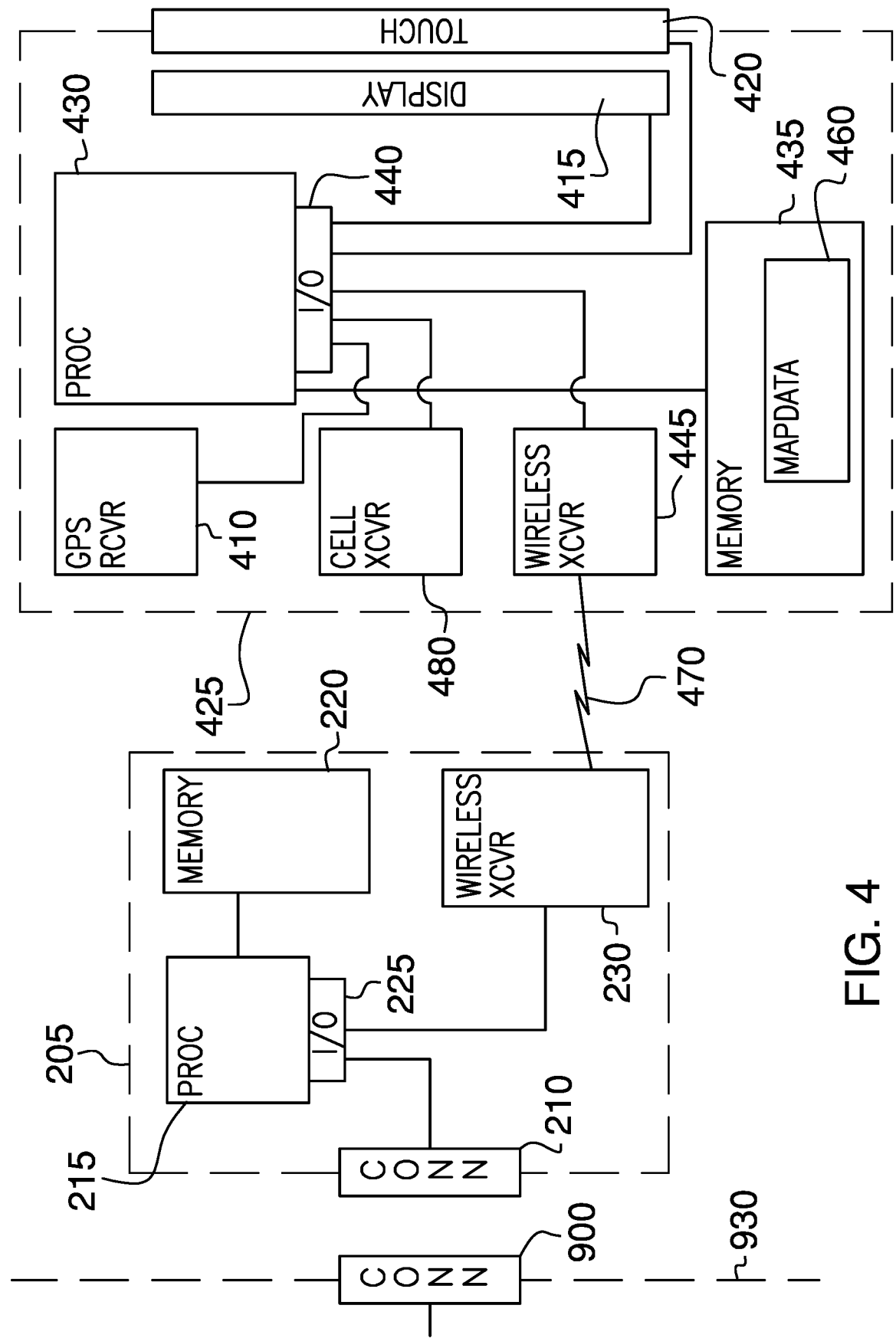
FIG. 4 is a block diagram of an embodiment of the disclosure illustrating functional blocks of the on board diagnostic interface unit and the GPS unit.

Detailed reference will now be made to a first potential embodiment of the disclosure, which is illustrated in FIGS. 1 through 4.

The GPS-based vehicular speed limiting system 100 (hereinafter invention) comprises an on board diagnostic interface unit 200 and a GPS unit 400. The on board diagnostic interface unit 200 may limit an actual speed of a vehicle 920 to conform with a speed limit 940 obtained from the GPS unit 400.

The on board diagnostic interface unit 200 comprises an ODB enclosure 205, an on board diagnostic pluggable connector 210, an interface unit microprocessor 215, an interface unit memory 220, and an interface unit wireless transceiver 230. The on board diagnostic interface unit 200 may plug into an on board diagnostic stationary connector 900 of the vehicle 920 where it may communicate with one or more vehicle computers 935 that monitor the engine 960. In general, the on board diagnostic stationary connector 900 may be located inside the passenger compartment of the vehicle 920, under a dashboard 930 on the driver side of the vehicle 920.

The ODB enclosure 205 is a protective cover for the on board diagnostic interface unit 200. The ODB enclosure 205 is not limited to any particular shape, but may generally be rectangular. The ODB enclosure 205 may provide gripping surfaces, on the top, bottom, left side, right side, or combinations thereof, that may be used to install or remove the on board diagnostic interface unit 200.

The on board diagnostic pluggable connector 210 may be coupled to the rear side of the ODB enclosure 205. The on board diagnostic pluggable connector 210 may hold the on board diagnostic interface unit 200 in place when installed in the vehicle 920 and may provide an electrical interconnection with the vehicle 920. The on board diagnostic interface unit 200 and the one or more vehicle computers 935 may communicate with each other by passing on board diagnostic messages over the electrical interconnection. As non-limiting examples, the on board diagnostic messages may be command messages and information response messages. The rear or bottom side of the GPS unit 400 may comprise a mount for attaching the GPS unit 400 to the dashboard 930 or windshield of the vehicle 920.

The on board diagnostic interface unit 200 may comprise the interface unit microprocessor 215 and the interface unit memory 220 wherein the interface unit memory 220 contains instructions for causing the interface unit microprocessor 215 to control the sequence and timing of the operation of the on board diagnostic interface unit 200. The interface unit microprocessor 215 may comprise an interface unit input/output ports 225 for interacting with the one or more vehicle computers 935 via the on board diagnostic pluggable connector 210 and for communicating with other devices via the interface unit wireless transceiver 230.

The interface unit wireless transceiver 230 may be a wireless communication interface. The on board diagnostic interface unit 200 may communicate with the GPS unit 400 over a wireless communication link 470 using the interface unit wireless transceiver 230. As a non-limiting example, the interface unit wireless transceiver 230 may be a Bluetooth transceiver. The interface unit microprocessor 215 may receive a report of the speed limit 940 for a current location from the GPS unit 400. The report of the speed limit 940 for the current location may arrive at the interface unit microprocessor 215 via the wireless communication link 470 between the interface unit wireless transceiver 230 and a GPS wireless transceiver 445. Responsive to receiving a report of the speed limit 940 for the current location, the interface unit microprocessor 215 may communicate with the one or more vehicle computers 935 and may instruct the one or more vehicle computers 935 to limit the actual speed of the vehicle 920 to conform to the speed limit 940. As non-limiting examples, the actual speed of the vehicle 920 may be limited by passing the speed limit 940 to the one or more vehicle computers 935 and allowing the one or more vehicle computers 935 to enforce the speed limit 940 or by having the interface unit microprocessor 215 repeatedly query the actual speed from the one or more vehicle computers 935 and override the throttle setting when necessary to limit the actual speed. The interface unit microprocessor 215 may determine the actual speed of the vehicle 920 either from querying the one or more vehicle computers 935 within the vehicle 920 to read the speedometer or from the GPS unit 400. The GPS unit 400 may compute the actual speed based upon the amount of change in the current location over a known period of time.

The GPS unit 400 comprises a GPS enclosure 425, a GPS microprocessor 430, a GPS memory 435, a GPS input/output ports 440, a GPS receiver 410, a GPS display 415, a GPS touch sensitive screen 420, and the GPS wireless transceiver 445. The GPS enclosure 425 may be a protective housing for the GPS unit 400. The front of the GPS enclosure 425 may comprise the GPS display 415 and the GPS touch sensitive screen 420. The GPS unit 400 may comprise the GPS microprocessor 430 and the GPS memory 435 wherein the GPS memory 435 contains instructions for causing the GPS microprocessor 430 to control the sequence and timing of the GPS unit 400. The GPS microprocessor 430 may comprise the GPS input/output ports 440 for interacting with the GPS receiver 410, the GPS display 415, the GPS touch sensitive screen 420, and the GPS wireless transceiver 445.

The GPS receiver 410 may listen for signals from a plurality of GPS satellites 980 and may compute the current location based upon an analysis of the timing of the signals and the known orbital mechanics of the plurality of GPS satellites 980. (Note that only one of the satellites is illustrated in the Figures.) The GPS unit 400 may comprise map data 460 stored in the GPS memory 435. The GPS microprocessors 430 may search the map data 460 to find the current location. As non-limiting examples, the map data 460 associated with the current location may provide the speed limit 940 associated with the current location and the topography of a road network in the immediate vicinity of the current location.

The GPS display 415 may be used to present at least a map showing the current location of the vehicle 920 and roads in the immediate vicinity of the vehicle 920. In some embodiments, the GPS display 415 may also show the current speed of the vehicle 920, the speed limit 940 for the current location, an estimated time of arrival at a destination, and other travel metrics.

The GPS touch sensitive screen 420 may be a touch-sensitive input to the GPS microprocessor 430. The GPS touch sensitive screen 420 may be transparent so that the GPS display 415 may be viewed though the GPS touch sensitive screen 420. Using the GPS touch sensitive screen 420, the contents of the GPS display 415 may be touched to interact with the GPS unit 400. As a non-limiting example, the GPS unit 400 may present menus and controls on the GPS display 415 to allow a destination to be selected and the GPS unit 400 may determine a route to get from the current location to the destination and may present turn-by-turn instructions on the GPS display 415.

The GPS wireless transceiver 445 may be a wireless communication interface. As a non-limiting example, the GPS wireless transceiver 445 may be a Bluetooth transceiver.

In some embodiments, the GPS unit 400 may comprise a cell phone transceiver 480. The cell phone transceiver 480 may be a transceiver that operates using frequencies and protocols that are compatible with the mobile telephone network. The cell phone transceiver 480 may enable communication between the GPS unit 400 and a software application 450 running on a smart phone 910. The software application 450 may enable or disable enforcement of the speed limit 940 by sending commands to the GPS unit 400. The GPS unit 400 may transmit the current location and a history of previous locations to the software application 450 so that the smart phone 910 may display the current location of the vehicle 920 and a map showing routes taken by the vehicle 920. The software application 450 may report that the on board diagnostic interface unit 200 has been removed from the on board diagnostic stationary connector 900. To do this, the GPS unit 400 senses a loss of the wireless communication link 470 between the on board diagnostic interface unit 200 and the GPS unit 400 when the on board diagnostic interface unit 200 is unplugged. Responsive to sensing the loss of the wireless communication link 470, the GPS microprocessor 430 may use the cell phone transceiver 480 to notify the software application 450 that the on board diagnostic interface unit 200 has been unplugged.

In some embodiments, the cell phone transceiver 480 may be used to update the map data 460 stored within the GPS unit 400. As a non-limiting example, updated map data may be downloaded to the smart phone 910 from an internet source and may be sent to the GPS unit 400 via the cell phone transceiver 480. Once in the GPS unit 400, the updated map data may replace the map data 460 stored in the GPS memory 435.

In use, the on board diagnostic interface unit 200 is plugged into the on board diagnostic stationary connector 900 of the vehicle 920 and the GPS unit 400 may be placed on the dashboard 930 or the windshield of the vehicle 920. As the vehicle 920 is driven, the GPS unit 400 will determine the current location, look the current location up in the map data 460, determine the speed limit 940 associated with the current location, and convey the speed limit 940 to the interface unit microprocessor 215 via the wireless communication link 470. The interface unit microprocessor 215 will determine the actual speed either from the one or more vehicle computers 935 or from the GPS unit 400 and will take steps to reduce the actual speed if necessary to stay under the speed limit 940.

If the software application 450 is installed on the smart phone 910 and configured to communicate with the GPS unit 400, the software application 450 may query the current location and history of movement of the vehicle 920 from the GPS unit 400. If the on board diagnostic interface unit 200 is removed from the on board diagnostic stationary connector 900, the removal may be detected by the GPS unit 400 due to the inability of the GPS unit 400 to communicate with the on board diagnostic interface unit 200 via the wireless communication link 470. In response to the removal of the on board diagnostic interface unit 200 from the on board diagnostic stationary connector 900, the GPS unit 400 may record the date and time of the removal and may attempt to contact the software application 450 on the smart phone 910 to report the removal.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "application" or "app" is software that is specifically designed for use with a personal computing device.

As used in this disclosure, "Bluetooth" is a standardized communication protocol that is used to wirelessly interconnect electronic devices. Bluetooth® is a registered trademark of Bluetooth SIG.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used herein, the words "data" and "information" are used interchangeably to refer to raw, unprocessed facts and to facts that have been processed, structured, organized, or presented in a context that makes the facts useful.

As used in this disclosure, a "display" is a surface upon which is presented an image, potentially including, but not limited to, graphic images and text, that is interpretable by an individual viewing the image. When used as a verb, "display" is defined as presenting such an image.

As used herein, "front" indicates the side of an object that is closest to a forward direction of travel under normal use of the object or the side or part of an object that normally presents itself to view or that is normally used first. "Rear" or "back" refers to the side that is opposite the front.

As used herein, "GPS" refers to a device that uses signals received from a system of navigational satellites to determine the position of the device. GPS is an acronym for Global Positioning System.

As used in this disclosure, a "housing" is a rigid casing that encloses and protects one or more devices.

As used in this disclosure, an "interface" is a physical or virtual boundary that separates two different systems and across which information is exchanged.

As used in this disclosure, a "plug" is an electrical termination that electrically connects a first electrical circuit to a second electrical circuit or a source of electricity. As used in this disclosure, a plug will have at least two metal pins.

As used herein, the terms "processor", "central processor", "central processing unit", "CPU", or "microprocessor" refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used in this disclosure, a "transceiver" is a device that is used to transmit and/or receive signals. The signals may be audible, optical, or RF in nature.

As used in this disclosure, "transparent" refers to a material that allows light to pass through the material without significant scattering such that an object can be clearly seen through the material.

As used in this disclosure, a "vehicle" is a device that is used for transporting passengers, goods, or equipment.

As used in this disclosure, a "windshield" refers to the front window of a vehicle that is intended to shield the occupants of the vehicle from the wind generated by the normal forward motion of the vehicle.

As used in this disclosure, "wireless" is an adjective that is used to describe a communication channel that does not require the use of physical cabling.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A GPS-based vehicular speed limiting system comprising:
    an on board diagnostic interface unit and a GPS unit;
    wherein the on board diagnostic interface unit limits an actual speed of a vehicle to conform with a speed limit obtained from the GPS unit;
    wherein the on board diagnostic interface unit comprises an ODB enclosure, an on board diagnostic pluggable connector, an interface unit microprocessor, an interface unit memory, and an interface unit wireless transceiver;
    wherein the on board diagnostic interface unit plugs into an on board diagnostic stationary connector of the vehicle where it communicates with one or more vehicle computers that monitor the engine; and
    wherein the ODB enclosure is a protective cover for the on board diagnostic interface unit;
    wherein the ODB enclosure provides gripping surfaces, on the top, bottom, left side, right side, or combinations thereof, that are used to install or remove the on board diagnostic interface unit.

2. The GPS-based vehicular speed limiting system according to claim 1, wherein the on board diagnostic pluggable connector is coupled to the rear side of the ODB enclosure; wherein the on board diagnostic pluggable connector holds the on board diagnostic interface unit in place when installed in the vehicle and provides an electrical interconnection with the vehicle; wherein the on board diagnostic interface unit and the one or more vehicle computers communicate with each other by passing on board diagnostic messages over the electrical interconnection.

3. The GPS-based vehicular speed limiting system according to claim 2
    wherein the on board diagnostic messages are command messages and information response messages.

4. The GPS-based vehicular speed limiting system according to claim 3
    wherein the on board diagnostic interface unit comprises the interface unit microprocessor and the interface unit memory wherein the interface unit memory contains instructions for causing the interface unit microprocessor to control the sequence and timing of the operation of the on board diagnostic interface unit.

5. The GPS-based vehicular speed limiting system according to claim 4
    wherein the interface unit wireless transceiver is a wireless communication interface;
    wherein the on board diagnostic interface unit communicates with the GPS unit over a wireless communication link using the interface unit wireless transceiver.

6. The GPS-based vehicular speed limiting system according to claim 5
    wherein the interface unit microprocessor receives a report of the speed limit for a current location from the GPS unit;
    wherein the report of the speed limit for the current location arrives at the interface unit microprocessor via the wireless communication link between the interface unit wireless transceiver and a GPS wireless transceiver;
    wherein responsive to receiving a report of the speed limit for the current location, the interface unit microprocessor communicates with the one or more vehicle computers and instructs the one or more vehicle computers to limit the actual speed of the vehicle to conform to the speed limit.

7. The GPS-based vehicular speed limiting system according to claim 6
    wherein the actual speed of the vehicle is limited by passing the speed limit to the one or more vehicle computers and allowing the one or more vehicle computers to enforce the speed limit or by having the interface unit microprocessor repeatedly query the actual speed from the one or more vehicle computers and override the throttle setting when necessary to limit the actual speed;
    wherein the interface unit microprocessor determines the actual speed of the vehicle either from querying the one or more vehicle computers within the vehicle to read the speedometer or from the GPS unit;
    wherein the GPS unit computes the actual speed based upon the amount of change in the current location over a known period of time.

8. The GPS-based vehicular speed limiting system according to claim 7
    wherein the GPS unit comprises a GPS enclosure, a GPS microprocessor, a GPS memory, a GPS input/output ports, a GPS receiver, a GPS display, a GPS touch sensitive screen, and the GPS wireless transceiver;
    wherein the GPS enclosure is a protective housing for the GPS unit;
    wherein the front of the GPS enclosure comprises the GPS display and the GPS touch sensitive screen;
    wherein the GPS unit comprises the GPS microprocessor and the GPS memory wherein the GPS memory contains instructions for causing the GPS microprocessor to control the sequence and timing of the GPS unit.

9. The GPS-based vehicular speed limiting system according to claim 8
    wherein the GPS receiver listens for signals from a plurality of GPS satellites and computes the current location based upon an analysis of the timing of the signals and the known orbital mechanics of the plurality of GPS satellites;
    wherein the GPS unit comprises map data stored in the GPS memory;
    wherein the GPS microprocessors searches the map data to find the current location.

10. The GPS-based vehicular speed limiting system according to claim 9
    wherein the map data associated with the current location provides the speed limit associated with the current location and the topography of a road network in the immediate vicinity of the current location.

11. The GPS-based vehicular speed limiting system according to claim 10
wherein the GPS display is used to present at least a map showing the current location of the vehicle and roads in the immediate vicinity of the vehicle.

12. The GPS-based vehicular speed limiting system according to claim 11
wherein the GPS touch sensitive screen is a touch-sensitive input to the GPS microprocessor;
wherein the GPS touch sensitive screen is transparent so that the GPS display is viewed though the GPS touch sensitive screen;
wherein using the GPS touch sensitive screen, the contents of the GPS display are touched to interact with the GPS unit.

13. The GPS-based vehicular speed limiting system according to claim 12
wherein the GPS unit presents menus and controls on the GPS display to allow a destination to be selected and the GPS unit determines a route to get from the current location to the destination and presents turn-by-turn instructions on the GPS display.

14. The GPS-based vehicular speed limiting system according to claim 13
wherein the GPS wireless transceiver is a wireless communication interface.

15. The GPS-based vehicular speed limiting system according to claim 14
wherein the GPS unit comprises a cell phone transceiver;
wherein the cell phone transceiver is a transceiver that operates using frequencies and protocols that are compatible with the mobile telephone network;
wherein the cell phone transceiver enables communication between the GPS unit and a software application running on a smart phone;
wherein the software application enables or disables enforcement of the speed limit by sending commands to the GPS unit.

16. The GPS-based vehicular speed limiting system according to claim 15
wherein the GPS unit transmits the current location and a history of previous locations to the software application so that the smart phone displays the current location of the vehicle and a map showing routes taken by the vehicle.

17. The GPS-based vehicular speed limiting system according to claim 16
wherein the software application reports that the on board diagnostic interface unit has been removed from the on board diagnostic stationary connector;
wherein the GPS unit senses a loss of the wireless communication link between the on board diagnostic interface unit and the GPS unit when the on board diagnostic interface unit is unplugged;
wherein responsive to sensing the loss of the wireless communication link, the GPS microprocessor uses the cell phone transceiver to notify the software application that the on board diagnostic interface unit has been unplugged.

18. The GPS-based vehicular speed limiting system according to claim 17
wherein the cell phone transceiver is used to update the map data stored within the GPS unit.

* * * * *